US008620497B2

(12) United States Patent
Ling et al.

(10) Patent No.: US 8,620,497 B2
(45) Date of Patent: Dec. 31, 2013

(54) COMPUTER INTERLOCKING SYSTEM AND CODE BIT LEVEL REDUNDANCY METHOD THEREFOR

(75) Inventors: Zhujun Ling, Shanghai (CN); Xiuxia Shi, Shanghai (CN); Jun Tang, Shanghai (CN); Gaoyun Dong, Shanghai (CN); Yuan Wang, Shanghai (CN)

(73) Assignee: Casco Signal Ltd., Shanghai (CN)

( * ) Notice: Subject to any disclaimer, the term of this patent is extended or adjusted under 35 U.S.C. 154(b) by 482 days.

(21) Appl. No.: 12/945,392

(22) Filed: Nov. 12, 2010

(65) Prior Publication Data

US 2011/0060938 A1 Mar. 10, 2011

Related U.S. Application Data

(63) Continuation-in-part of application No. PCT/CN2009/000504, filed on May 11, 2009.

(30) Foreign Application Priority Data

May 12, 2008 (CN) .......................... 2008 1 0037297

(51) Int. Cl.
*G06F 11/16* (2006.01)

(52) U.S. Cl.
USPC ........... 701/19; 701/33.7; 701/34.3; 340/506; 340/507; 340/508; 700/79; 700/81; 246/131; 246/132; 246/133; 246/134

(58) Field of Classification Search
USPC .............. 701/19, 29.1, 29.7, 30.6, 33.7, 34.3; 340/3.1, 3.43, 506, 507, 508; 700/79, 700/81; 714/819, 820; 246/131, 132, 133, 246/134
See application file for complete search history.

(56) References Cited

U.S. PATENT DOCUMENTS

| 4,096,990 | A | * | 6/1978 | Strelow ........................... 714/11 |
| 4,517,673 | A | * | 5/1985 | Brown et al. ................... 714/10 |
| 4,611,291 | A | * | 9/1986 | Hoelscher ....................... 702/57 |
| 4,641,243 | A | * | 2/1987 | Hartkopf et al. .............. 701/117 |
| 4,763,267 | A | * | 8/1988 | Knight et al. ................. 701/117 |
| 5,504,860 | A | * | 4/1996 | George et al. ................... 714/11 |
| 5,572,662 | A | * | 11/1996 | Ohta et al. ....................... 714/11 |
| 5,805,797 | A | * | 9/1998 | Sato et al. ....................... 714/48 |
| 5,954,299 | A | * | 9/1999 | Pace ............................. 246/293 |
| 6,308,117 | B1 | * | 10/2001 | Ryland et al. ................... 701/19 |
| 6,424,258 | B1 | * | 7/2002 | Claes ............................. 340/514 |

(Continued)

FOREIGN PATENT DOCUMENTS

| CN | 1167564 | 9/2004 |
| CN | 1557666 | 12/2004 |
| CN | 1803510 | 7/2006 |
| CN | 201151415 | 11/2008 |

OTHER PUBLICATIONS

International Search Report for international application No. PCT/CN2009/000504, dated Aug. 20, 2009 (4 pages).

*Primary Examiner* — Khoi Tran
*Assistant Examiner* — Peter D Nolan
(74) *Attorney, Agent, or Firm* — Hamre, Schumann, Mueller & Larson, P.C.

(57) ABSTRACT

A code bit level redundancy method for a computer interlocking system is provided. The method includes: (1) controlling the output in parallel, and (2) sharing the collected information.

2 Claims, 3 Drawing Sheets

(56) References Cited

U.S. PATENT DOCUMENTS

| | | | |
|---|---|---|---|
| 6,502,019 B1 * | 12/2002 | Zydek et al. | 701/33.7 |
| 7,290,170 B2 * | 10/2007 | Anderson et al. | 714/11 |
| 7,363,187 B2 * | 4/2008 | Winkler et al. | 702/115 |
| 7,676,286 B2 * | 3/2010 | Disser et al. | 700/82 |
| 8,028,961 B2 * | 10/2011 | Ashraf et al. | 246/167 R |
| 8,214,092 B2 * | 7/2012 | Ghaly | 701/19 |
| 8,260,487 B2 * | 9/2012 | Plawecki | 701/31.7 |
| 2002/0040252 A1 * | 4/2002 | Behr et al. | 700/79 |
| 2007/0255875 A1 * | 11/2007 | Weiberle et al. | 710/116 |

\* cited by examiner

COMPUTER INTERLOCKING SYSTEM AND CODE BIT LEVEL REDUNDANCY METHOD THEREFOR

This application is a continuation-in-part application of PCT/CN2009/000504, filed on May 11, 2009, entitled CODE BIT LEVEL REDUNDANCY METHOD FOR COMPUTER INTERLOCKING SYSTEM, which claims priority to Chinese Application No. 200810037297.3, filed on May 12, 2008. The entire contents of PCT/CN2009/000504 are incorporated herein by reference.

FIELD

This disclosure relates to interlocking technology used in high speed railways, conventional railways, and metropolitan rail transportation. More specifically, this disclosure relates to a code-bit level redundancy method for computer interlocking systems.

BACKGROUND

Computer interlocking systems must not only control routes, signals and switches under its required interlocking conditions and time sequences, but also collect status information. In order to enhance the reliability during a 24-hour non-stop operation of a railway system or a metropolitan rail transportation system, the computer interlocking system should adopt hardware safety redundancy structures, for example, a dual-machine hot-standby structure that uses a dual 2 out of 2 (2oo2) mode or a 2 out of 3 (2oo3) mode. The dual 2 out of 2 mode is a redundancy configuration that includes two identical sets. Each set has two functional modules which have the same functions and check with each other over the time. Only when operations of the two modules of a set have the same results, the respective set provides effective output, which is the so called 2oo2 mode. The 2 out of 3 mode is a redundancy configuration that includes three functional modules which have the same functions. A voter is added to the output of the three modules. As long as any two of the modules have the same output, the output of the voter will be the AND function of the output of the two modules.

An interlocking processing system has a double hot-redundancy configuration consisting of two subsystems A and B. Each subsystem applies a 2oo2 configuration. Regardless whether the A system and the B system are simultaneously activated, the two systems will be automatically synchronized if both systems function correctly and synchronization check conditions are satisfied. When one subsystem is malfunctioning, the interlocking processing system will switch to the standby subsystem. Switching between the two subsystems can also be manually achieved by the system-switching button on the machine body. Such switching would not affect the working of the interlocking processing system.

Current computer interlocking systems use a working subsystem and a standby subsystem or a board level hot standby may be obtained. Although the two subsystems simultaneously collect information, each subsystem only uses the information it collects for interlocking calculation. Moreover, only the working subsystem has an output to a relay of an interface circuit so as to control field equipment. Under this working mechanism, when the two subsystems both encounter malfunction which should not affect the normal working of the system, neither of the two subsystems can complete its tasks. Therefore, this working mechanism compromises the efficiency of a computer interlocking system in its application to large scale stations.

SUMMARY

A method is described herein that can overcome the deficiencies in current technologies, and thus to provide a reliable and redundancy-safe code bit level redundancy method for computer interlocking systems.

In one disclosed embodiment, a code bit level redundancy method for computer interlocking systems comprises: (1) controlling output in parallel, and (2) sharing collected information.

The controlling output in parallel comprises:
  (1) setting a signal machine wherein each of a working subsystem and a standby subsystem provides an output in parallel; and if the working subsystem has no output, turning off an associated output of the standby system;
  (2) setting switches wherein the standby subsystem does not output a switch control order, thereby ensuring the safety of the system;
  (3) for a long-time-effective output port, setting the working and standby subsystems to provide a parallel output; if logics of the working subsystem and the standby subsystem are not synchronized, setting the standby subsystem to stop providing output;
    if the communication between the standby subsystem and a man-machine interface breaks down, setting the standby subsystem to stop providing output; and
    for a short-time-effective output port, setting the working subsystem to provide an output, and setting the standby subsystem to provide no output;
  (4) setting the subsystem under an emulation test to provide no output; and
  (5) setting the standby subsystem to provide no outputs when a switch is on a manual mode; and
  (6) setting the standby subsystem to provide no output when the communication between the working subsystem and the standby system breaks down.

In carrying out the sharing collected information, the method comprises:
  (1) setting a sharing of collected information except for system code bits:
    a. when a section is used to perform an idle check with cleared signals, information is collected by sections shared by the subsystems;
    b. when a section is used to a three-point check to unlock a train under operation, information is collected by sections of the respective subsystem; the three-point check is a way to release a route by checking three sections (a departure section, a current section, and an approach section) of the route, where when the departure section is released, the current section is cleared, and the approach section is occupied, the current section would be released immediately;
  (2) setting a switch on a manual mode such that the working subsystem and the standby subsystem stop sharing collected information;
  (3) setting a subsystem under an emulation test to stop sharing collected information; and
  (4) setting subsystems not to share collected information of a redundant subsystem when the redundant subsystem is determined to be abnormal by a self-test.

In another embodiment, a code bit level redundancy computer interlocking system includes a plurality of subsystems each receiving information from an information collecting module, where the subsystems are adapted to share therebetween the information received from the information collecting module, and the subsystems are adapted to control output of the subsystems in parallel to operational devices.

Compared to the pre-existing technology, this method can enhance the reliability of computer interlocking systems, including those used in stations of large scales or substantial operating demands. This advantage would be particularly helpful to railway systems in China where the terminal blocks of relay circuits often incur malfunction. By controlling the output in parallel and sharing the collected information, this method can effectively prevent the sudden shutdown of signals and any resulting emergency breaking of the trains. Thus, it would also minimize the impact of any strong interference in the stations.

DRAWINGS

DETAILED DESCRIPTION

Below is a description of the embodiments of this disclosure based on an interlocking processing subsystem (IPS) of an interlocking system.

Figure 1:
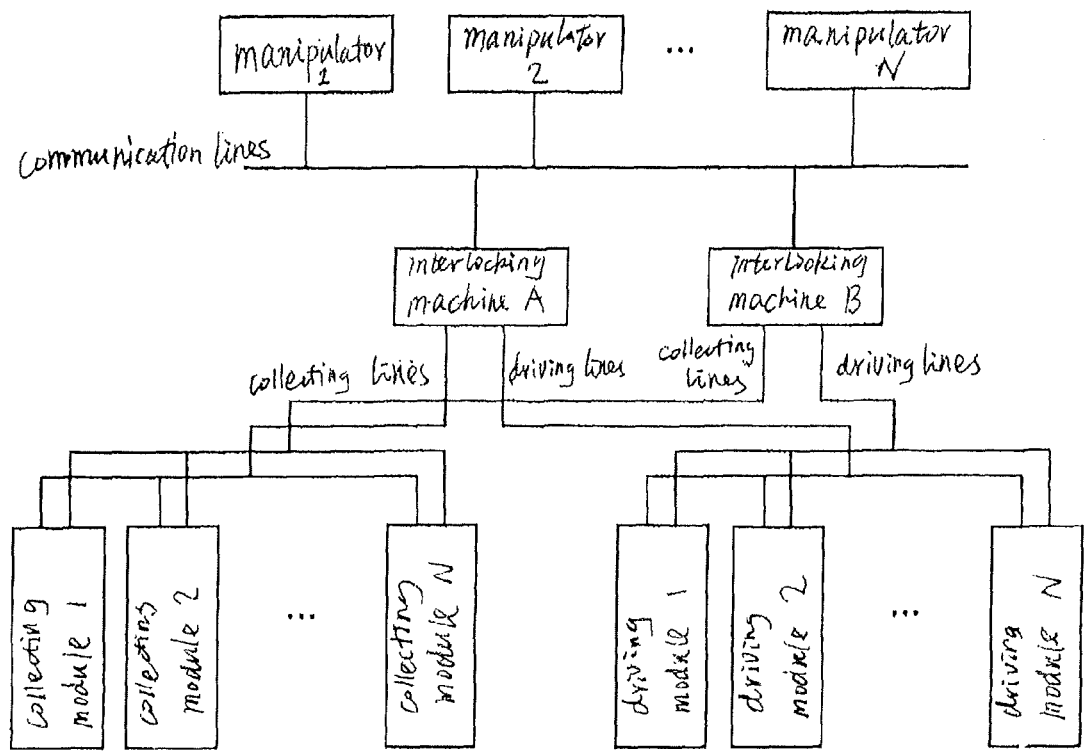
FIG. 1 shows an exemplary structure of a computer interlocking system.

FIG. 1 shows an exemplary computer interlocking system, which comprises manipulator 1, manipulator 2, . . . , and manipulator N, interlocking machine A, interlocking machine B, collecting module 1, collecting module 2, . . . , collecting module N, driving module 1, driving module 2, . . . , and driving module N. The manipulators are connected to the interlocking machines via communication lines. The interlocking machines are connected to the collecting modules via collecting lines. The interlocking machines are also connected to the driving modules via the driving lines.

Figure 2:
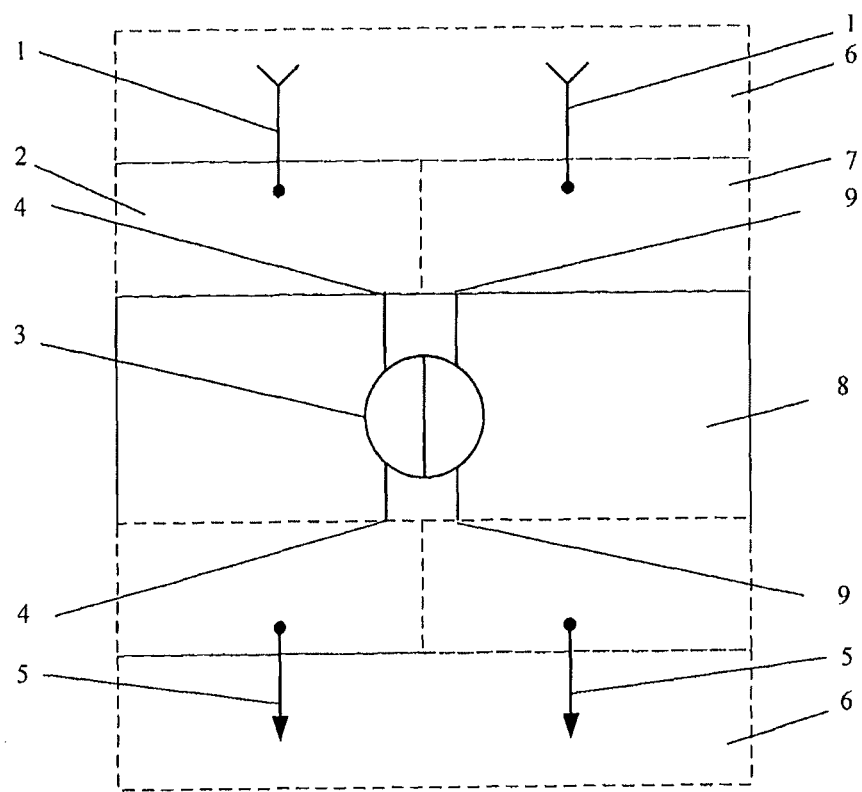
FIG. 2 shows an exemplary interface circuit for controlling the output in parallel in a code bit level redundancy method for computer interlocking systems.

FIG. 2 illustrates an embodiment of controlling output in parallel. KZ power supply 1 and KF power supply 5, both plugged into power source panel 6, are connected to an IPS, such as the IPS of FIG. 1, to provide the driving power to an interface relay 3 in an interface circuit 8.

The controlling of parallel output is fulfilled in an application design. An interlocking machine, such as the interlocking machine A in FIG. 1, also shown in FIG. 2 as IPSA 2 and an interlocking machine, such as the interlocking machine B in FIG. 1, also shown in FIG. 2 as IPSB 7, drive a set of relay coils in a driving relay, respectively. IPSA 2 has an output port A-OUT 4 and IPSB 7 has an output port B-OUT 9. The parallel control is fulfilled at a port when the output ports A-OUT 4 and B-OUT 9 output simultaneously. Moreover, when application software determines that an output port cannot be controlled in parallel, a standby system will stop outputting at the specific output port, and only coils of a set of relays of an associated working system will be supplied with a driving power source, which fulfills a driving by a single system.

Controlling output in parallel is such an output method that can prevent undesired impacts of breaking down in a single-system power driving configuration, and/or any outside interferences on a system. in achieving such parallel controlling, the working subsystem and the standby subsystem simultaneously (always or under certain conditions) provide output with respect to a same code bit under following conditions:

(1) code-bit by code-bit tracking parallel controlling: The working subsystem and the standby subsystem provide output in parallel. When the working subsystem has no output for a particular code bit, the associated standby subsystem will stop outputting the particular code bit;

(2) synchronization parallel controlling: when the logic of the working subsystem and the standby subsystem is in synchronization and the communication of the system functions correctly, the two subsystems provide output in parallel; when the logic is not in synchronization, the standby subsystem has no output; and when a communication between the standby subsystem and a man-machine interface (MMI) breaks down, the standby subsystem has no output;

(3) time effectiveness parallel controlling: the working subsystem and the standby subsystem do not provide output in parallel with respect to certain code bits; and only when the standby subsystem detects that the working subsystem cannot effectively provide output to the certain code bits, the parallel output mode will be activated to control the output to the certain code bits, and a user alert will also be generated;

(4) no controlling in parallel: due to special design needs, the method of controlling output in parallel cannot be applied to certain code bits. The working subsystem instead of the standby subsystem will control the output with respect to those code bits; and (5) under an interlocking testing or an emulation testing, the parallel output will be cut off.

Figure 3:
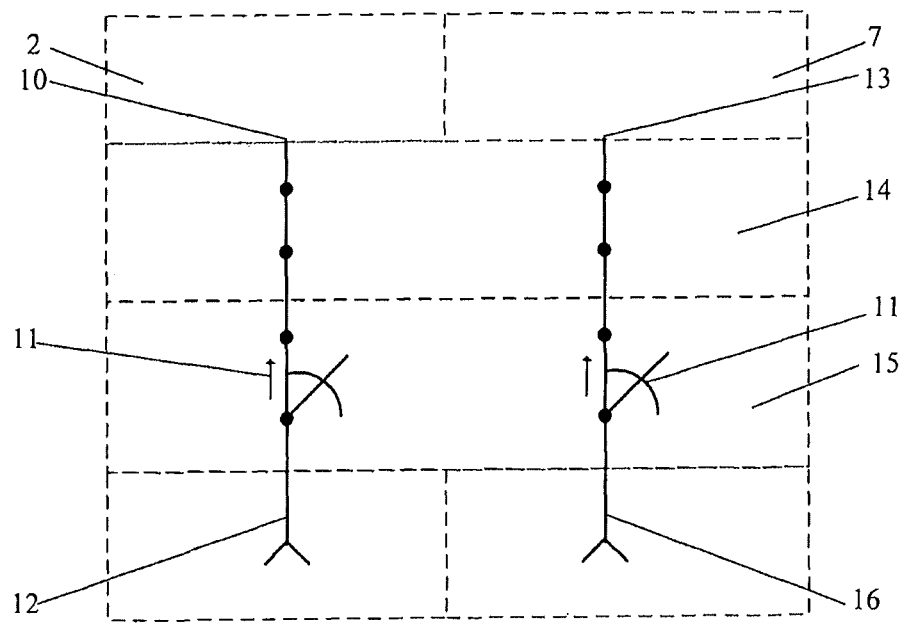
FIG. 3 shows an exemplary interface circuit for sharing the collected information in a code bit level redundancy method for computer interlocking systems.

FIG. 3 shows an embodiment for sharing collected information. Interlocking machines IPSA 2 and IPSB 7 provide a collecting power source for a computer interlocking system. In effectuating the information collection, the collecting power is sequentially delivered to an interface port 14, to a connecting point of a relay, and to collecting ports B 12/24 (IPSA) 12 and B 12/24 (IPSB) 16 of the interlocking subsystems. An interface relay 11 is disposed within an interface circuit 15.

For same collected information, interlocking machines IPSA 2 and IPSB 7 collect the information at different connecting points of the interface relay 11. As long as the relay and transmission lines function correctly, IPSA 2 and IPSB7 can simultaneously receive that collected information, i.e., input ports A-IN 10 and B-IN 13 have simultaneous information input. IPSA 2 and IPSB 7 then transmit the information to each other via a secure communication. Based on a specific type of the information and a status of the application, application software determines whether the information should be shared by IPSA 2 and IPSB 7.

In one embodiment, a computer interlocking system can output a parallel control and share collected information in adaption to the characteristics of various signal equipments and/or the needs of various practical applications.

A working subsystem and a standby subsystem transmit information to each other via a secure communication to share collected information, which prevents the impacts of breaking down in a single-system collection configuration and/or any outside interferences on the system. Specifically, one embodiment of sharing collected information based on redundancy techniques includes:

(1) unified sharing: during interlocking logic operations, the system shares collected information uniformly;

(2) conditional sharing: because some collected information is time-sensitive, the time differences resulted from the transmission between the working subsystem and the standby subsystem may affect the interlocking logic operation; the time-sensitive collected information may be used in other logic operations; and depending on the type of logic operations to be used, the system determines whether to share the time-sensitive collected information or not;

(3) no sharing: some collected information reflects current status of each subsystem independently; for example, system code bits reflect current working status of respective subsystem; and thus, the interlocking system will not share the above collected information; and (4) under an interlocking testing or an emulation testing, sharing of collected information will be cut off.

A computer interlocking system can achieve switching between the working subsystem and the standby subsystem via a manual switch. The manual switch has three states: "Interlocking System A," "Auto," and "Interlocking System B." Under normal circumstances, the manual switch is set to the "Auto" state. There are two situations prompt for manual switching:

(1) if the manual switch has been set to the state of one of the interlocking systems, for example, the interlocking system A, for a long period, the computer interlocking system is not engaged in the controlling of the output in parallel and the sharing of the collected information; and (2) if the Interlocking System A was originally the working subsystem, the manual switch allows the Interlocking System B to be the working subsystem; and in order to avoid system shutdown and to ensure continued output, the Interlocking System A will stop controlling the output in parallel and sharing the collected information after the manual switch is switched to "Interlocking System B."

The invention claimed is:

1. A code bit level redundancy method for a computer interlocking system, the method comprising:
　controlling, in parallel, an output of a working subsystem and an associated output of a standby subsystem, said controlling comprising:
　　setting a signal machine by the working subsystem and the standby subsystem, wherein, when the working subsystem has no output, the method further comprises turning off the associated output of the standby subsystem;
　　setting one or more switches via a switch control order from the working subsystem, wherein the standby subsystem does not output a respective switch control order;
　　setting the working subsystem and the standby subsystem to provide the respective outputs in parallel to a long-time-effective output port;
　　setting the standby subsystem to stop providing the associated output when: a logic of the working subsystem and a logic of the standby subsystem are not synchronized or communication between the standby subsystem and a man-machine interface breaks down;
　　setting the standby system to not provide an output to a short-time-effective output port when the working subsystem provides a respective output to the short-time-effective output port;
　　wherein, when one or more of the working subsystem and the standby subsystem are under an emulation test, the one or more subsystems under the emulation test provide no output, and
　　wherein, when a system-switch is set to a manual mode, the standby subsystem provides no output;
　　wherein, when communication between the working subsystem and the standby system breaks down, the standby subsystem provides no output;
　　and sharing collected information, said shared collected information excluding system code bits, said sharing further comprising:
　　　collecting said shared information by sections shared by the working and standby subsystems when performing a clearing check with opening signals;
　　　collecting said shared information by sections of the respective subsystems when a section is used in a three-point check to unlock a route under operation; and
　　　stopping the sharing of collected information when: the system-switch is set to the manual mode, one or more of the subsystems are under an emulation test, or when a redundant subsystem is determined to be abnormal by a self-test.

2. A code bit level redundancy computer interlocking system, comprising:
　a working subsystem and a standby subsystem, each configured to receive information from at least one information collecting module and adapted to share the information received from the at least one collecting module, wherein the system is configured such that:
　　the shared information excludes system code bits;
　　the information is collected by sections shared by the subsystems when a section is used to perform an idle check with cleared signals;
　　the information is collected by sections of the respective subsystems when a section is used to perform a three-point check to unlock a train under operation;
　　a system-switch can be set a manual mode wherein the working subsystem and the standby subsystem stop sharing the received information;
　　one or more of the working and standby subsystems under an emulation test is set to stop sharing the received information; and
　　the subsystems do not share the received information of a redundant subsystem when the redundant subsystem is determined to be abnormal by a self-test;
　and the subsystems are further configured to control the respective outputs of the subsystems in parallel to operational devices, wherein;
　　the subsystems provide the respective outputs in parallel to set a signal machine, wherein, when the working subsystem has no output, an associated output of the standby subsystem is turned off;
　　the working subsystem is configured to output a switch control order to set switches and the standby subsystem does not output a corresponding switch control order;
　　the working subsystem and the standby subsystem are set to provide the respective outputs in parallel to a long-time-effective output port;
　　wherein, when a logic of the working subsystem and a logic of the standby system are not synchronized, the standby subsystem is set to stop providing its respective output;
　　when communication between the standby subsystem and a man-machine interface breaks down, the standby subsystem is set to stop providing its respective output;
　　when the working subsystem provides an output to a short-time-effective output port, the standby subsystem is set to provide no output to the short-time-effective output port;
　　when one or more subsystems are under an emulation test, the one or more subsystems under the emulation test provide no output;

when the system-switch is set to a manual mode, the standby subsystem provides no output, and when communication between the working subsystem and the standby subsystem breaks down, the standby subsystem provides no output.

\* \* \* \* \*